United States Patent
Benavides Padron et al.

(10) Patent No.: US 12,517,318 B2
(45) Date of Patent: Jan. 6, 2026

(54) PROJECTION ADJUSTMENT ASSEMBLY FOR FIBER OPTIC EQUIPMENT

(71) Applicant: CORNING RESEARCH & DEVELOPMENT CORPORATION, Corning, NY (US)

(72) Inventors: Santos Ramiro Benavides Padron, Reynosa (MX); Roberto Valderrabano Berrones, Coppell, TX (US); Juan Miguel Gonzalez Covarrubias, Reynosa (MX); Nestor Eduardo Sanchez Arriaga, Lomas (MX)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 595 days.

(21) Appl. No.: 17/881,672

(22) Filed: Aug. 5, 2022

(65) Prior Publication Data
US 2023/0052591 A1 Feb. 16, 2023

Related U.S. Application Data

(60) Provisional application No. 63/232,236, filed on Aug. 12, 2021.

(51) Int. Cl.
*G02B 6/00* (2006.01)
*G02B 6/36* (2006.01)
*G02B 6/38* (2006.01)
*G02B 6/44* (2006.01)

(52) U.S. Cl.
CPC ....... *G02B 6/44526* (2023.05); *G02B 6/3616* (2013.01); *G02B 6/3825* (2013.01); *G02B 6/44528* (2023.05)

(58) Field of Classification Search
CPC .. G02B 6/4452; G02B 6/3616; G02B 6/3825; G02B 6/00
See application file for complete search history.

(56) References Cited

U.S. PATENT DOCUMENTS

| | | | | |
|---|---|---|---|---|
| 10,302,885 B2* | 5/2019 | Morris | ............... | G02B 6/44524 |
| 2010/0054682 A1* | 3/2010 | Cooke | ................. | G02B 6/4455 |
| | | | | 385/135 |
| 2014/0037259 A1* | 2/2014 | Bragg | ................. | H01R 13/743 |
| | | | | 361/627 |

* cited by examiner

*Primary Examiner* — Jennifer Doan
(74) *Attorney, Agent, or Firm* — Kapil U. Banakar

(57) ABSTRACT

A fiber optic apparatus is provided including a support bracket configured to be mounted to an equipment rack, the bracket having a movable projection extending therefrom and a chassis configured to support fiber optic communication equipment, the chassis including a plurality of detents or apertures configured to receive the movable projection, wherein the engagement of the movable projection into one of the detents or apertures defines the projection of the chassis from the rack.

18 Claims, 10 Drawing Sheets

PROJECTION ADJUSTMENT ASSEMBLY FOR FIBER OPTIC EQUIPMENT

PRIORITY APPLICATION

This application claims the benefit of priority of U.S. Provisional Application No. 63/232,236, filed on Aug. 12, 2021, the content of which is relied upon and incorporated herein by reference in its entirety.

BACKGROUND

Field of the Disclosure

The technology of the disclosure relates to mounting of fiber optic equipment.

Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

The fiber optic equipment is customized based on the application need. The fiber optic equipment is typically included in housings that are mounted in equipment racks to maximize space. One example of such fiber optic equipment is a fiber optic module. A fiber optic module is designed to provide cable-to-cable fiber optic connections and manage the polarity of fiber optic cable connections. The fiber optic module is typically mounted to a chassis which is then mounted inside an equipment rack. The chassis may provide one or more trays that are extendable from the equipment rack like a drawer. This allows a technician access to fiber optic adapters disposed in the fiber optic module and any fiber optic cables connected to the fiber optic adapters without removing the fiber optic module from the equipment rack.

Generally, the projection of the chassis from the equipment rack is set prior to installation of the chassis into the rack, and necessitates removal of the chassis to change the depth of the projection, if it can be changed at all. In some examples, brackets are provided on either side of the chassis which are integral to the chassis, which are and then screwed or otherwise affixed to the equipment rack. These brackets are not movable and the projection of the chassis is determined by the design of the chassis and brackets. In another example movable brackets may be provided. The movable brackets may include a plurality of fasteners to affix the brackets to either sidewall of the chassis. To change the depth of the projection of the chassis, the technician must remove the plurality of fasteners, change the position of the brackets, and then replace the plurality of fasteners. As such, changing of the projection depth of the chassis cannot be performed in place and requires hardware to be disassembled and reassembled.

SUMMARY OF THE DETAILED DESCRIPTION

Embodiments disclosed in the detailed description include fiber optic equipment and apparatuses, such as fiber optic chassis that may be change projection depth, while in place on an equipment rack. One or more support brackets may be installed on an equipment rack, at least one support bracket having movable projection configured to engage one of a plurality of detents, or apertures in a chassis. The projection of the chassis from the equipment rack is defined by which of the plurality of detents the movable projection engages. The support brackets may include a support feature configured to support the chassis by engaging a recess or opening in a sidewall. The support feature may enable a technician to install the brackets and then place the chassis on the support feature. This arrangement eliminates the need to support the chassis while connecting supporting elements of the fiber optic assembly. Additionally, the projection of the chassis from the equipment rack may be changed with the chassis in place, including after network connection.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION

Reference will now be made in detail to examples illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic equipment and apparatuses that support independently translatable fiber optic modules and/or fiber optic equipment trays containing one or more fiber optic modules. In some embodiments, one or more fiber optic modules are disposed in a plurality of independently translatable fiber optic equipment trays. The fiber optic equipment trays are received in a tray guide system disposed in the fiber optic equipment. In this manner, each fiber optic equipment tray is independently translatable within the guide system. The one or more fiber optic modules disposed in each fiber optic equipment tray translate with their respective fiber optic equipment tray when translated.

One or more module guides may also be disposed in each of the fiber optic equipment trays. The fiber optic modules can be disposed in one or more module guides. The fiber optic modules translate within the module guides. In this manner, each fiber optic module disposed in a given fiber optic equipment tray may translate independently of other fiber optic modules in the same fiber optic equipment tray as well as each fiber optic equipment tray being independently translatable to other fiber optic equipment trays within the tray guide system.

Figure 1:
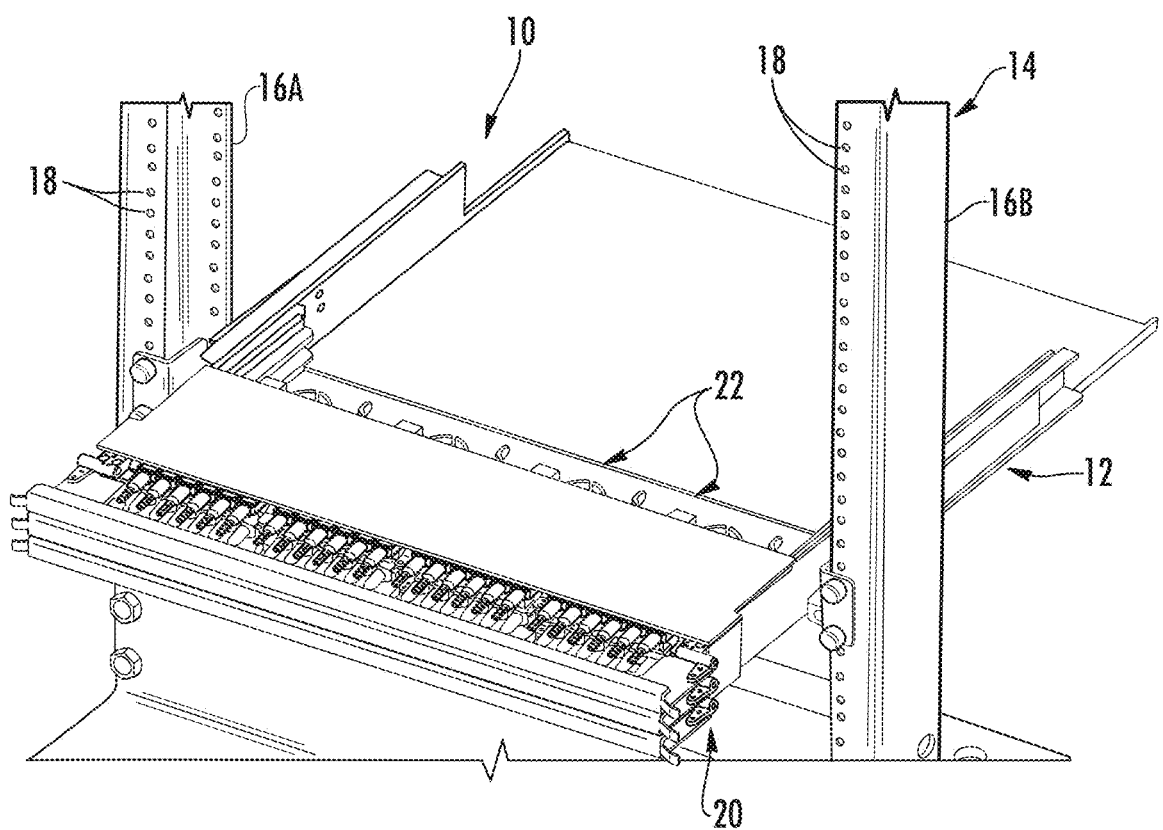
FIG. 1 is a front perspective view of an exemplary fiber optic equipment rack with exemplary fiber optic equipment supporting rear-installable fiber optic modules according to one embodiment.

In this regard, FIG. 1 illustrates exemplary fiber optic equipment 10. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more rear-installable fiber optic modules. The fiber optic modules can be fiber optic adapter modules or any other type of fiber optic modules or fiber optic apparatuses, including those that support fiber optic connections. Both the fiber optic modules and the fiber optic equipment trays are rear-installable, meaning they can be installed from a rear section of the fiber optic equipment 10. Further, both the fiber optic equipment trays and the fiber optic modules supported therein are independently translatable about the chassis for installation, access, and/or removal.

In this regard and as illustrated in FIG. 1, the fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the fiber optic equipment 10 inside the fiber optic equipment rack 14. The fiber optic equipment 10 is attached and supported by the fiber optic equipment rack 14 in the form of shelves that are stacked on top of each other within the vertical rails 16A, 16B. As illustrated, the fiber optic equipment 10 is attached to the vertical rails 16A, 16B. The fiber optic equipment rack 14 may support 1U-sized shelves, with "U" equal a standard 1.75 inches in height. As will be discussed in greater detail later in this application, the fiber optic equipment 10 includes a plurality of extendable fiber optic equipment trays 20 that each carries one or more rear-installable fiber optic modules 22. In this example, the fiber optic equipment 10 provides a density of 144 fibers, although it is not limited to this density. In other embodiments, including very small form factor connectors, such as SN or MDC connectors, the density per U may be Further, as will also be described in more detail below, each fiber optic equipment tray 20 is independently translatable and accessible to access the fiber optic modules supported therein.

Figures 2A, 2B:
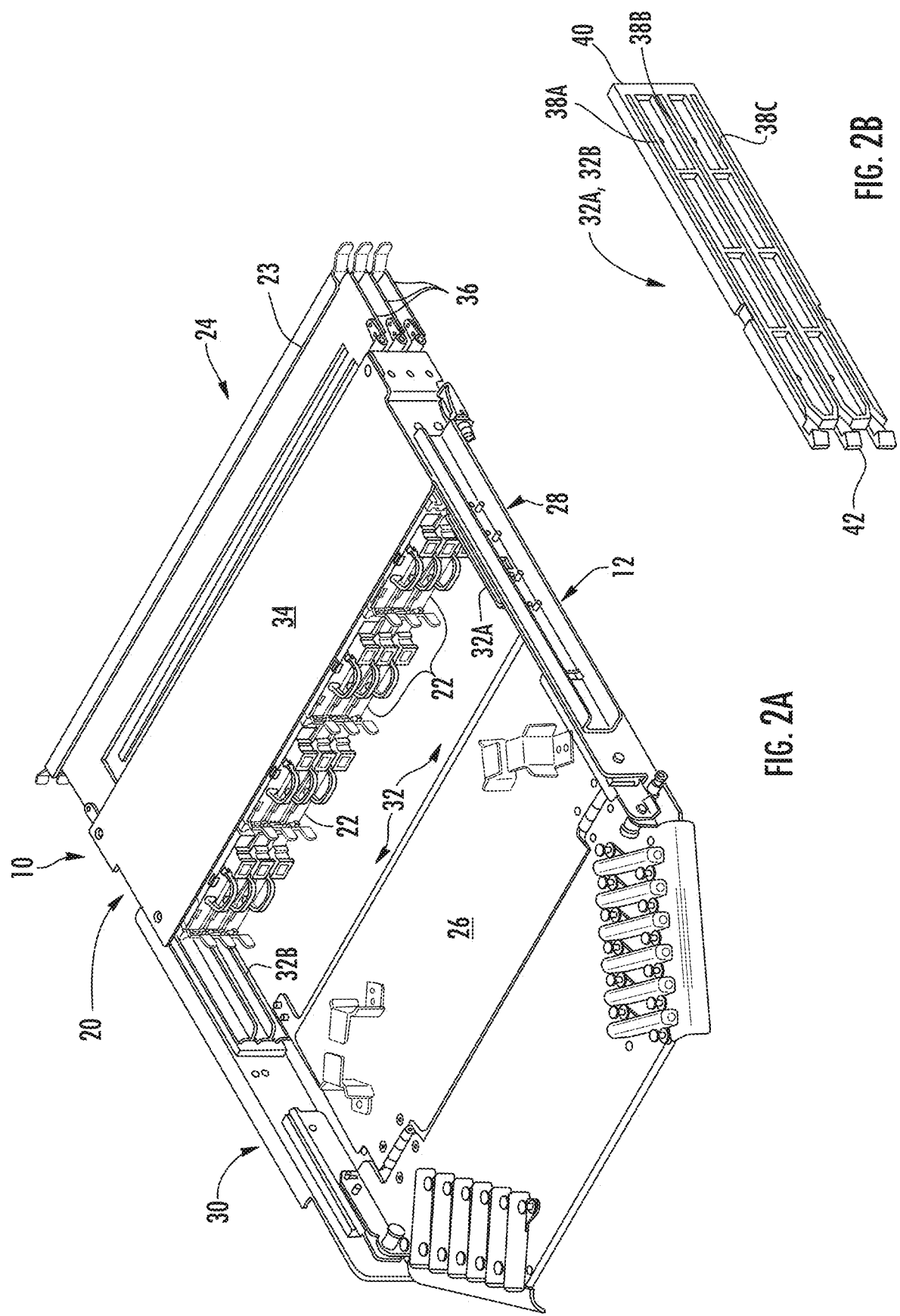
FIG. 2A is a rear perspective view of the fiber optic equipment supporting the rear-installable fiber optic modules of FIG. 1.
FIG. 2B is a perspective view of fiber optic equipment tray guides disposed in the fiber optic equipment of FIG. 1.

FIG. 2A illustrates a rear perspective view of the fiber optic equipment 10 illustrated in FIG. 1. The fiber optic equipment 10 is provided in the chassis 12 that defines a front end 24, a rear section 26, a first end 28, and a second end 30. The first end 28 of the chassis 12 is disposed on the opposite side of the second end 30 of the chassis 12. A guide system in the form of a rail guide system 32 is provided to support the rear-installable fiber optic modules 22. The rail guide system 32 comprises two tray rail guides 32A, 32B attached to the chassis 12 on the first end 28 and the second end 30, respectively. The tray rail guides 32A, 32B are configured to support one or more fiber optic equipment trays that support the fiber optic modules 22, which will be illustrated in FIG. 3 and described below. The tray rail guides 32A, 32B allow each fiber optic equipment tray 20 installed therein to be translated about the chassis 12. In this example, the chassis 12 supports three (3) fiber optic equipment trays 20 with each one stacked on top of each other. A tray cover 34 is disposed on top of the top fiber optic equipment tray 20 disposed in the chassis 12 and within the tray rail guides 32A, 32B. As will be discussed later in this application, each fiber optic equipment tray 20 contains a fiber routing tray 36 attached thereto to support routing of optical fibers connected to the fiber optic modules 22. The fiber routing tray 36 can be extended and lowered as desired to obtain access to the fiber optic modules 22 from the front end 24 of the fiber optic equipment 10.

FIG. 2B illustrates the tray rail guides 32A, 32B in more detail. As illustrated therein, the tray rail guides 32A, 32B form a series of channels 38A-38C, wherein each channel 38A-38C is configured to receive a fiber optic equipment tray 20. The tray rail guides 32A, 32B allow a plurality of fiber optic trays 20 arranged in a column format. The tray rail guides 32A, 32B comprise an end portion 40 by which the channels 38A-38C stop and the fiber optic equipment trays 20 cannot extend beyond. This end portion 40 is disposed in an orientation such that it is adjacent the rear section 26 of the fiber optic equipment 10. The tray rail guides 32A, 32B also contain an entry portion 42 through which the fiber optic equipment trays 20 can be inserted into the channels 38A-38C. Note that the entry portion 42 does not close off the channels 38A-38C such that the fiber optic equipment trays 20 can be extended beyond the entry portion 42 back towards the rear section 26 of the chassis 12. In this manner, the tray rail guides 32A, 32B support rear installation of fiber optic equipment trays 20 into the chassis 12 from the rear section 26.

Figure 3:
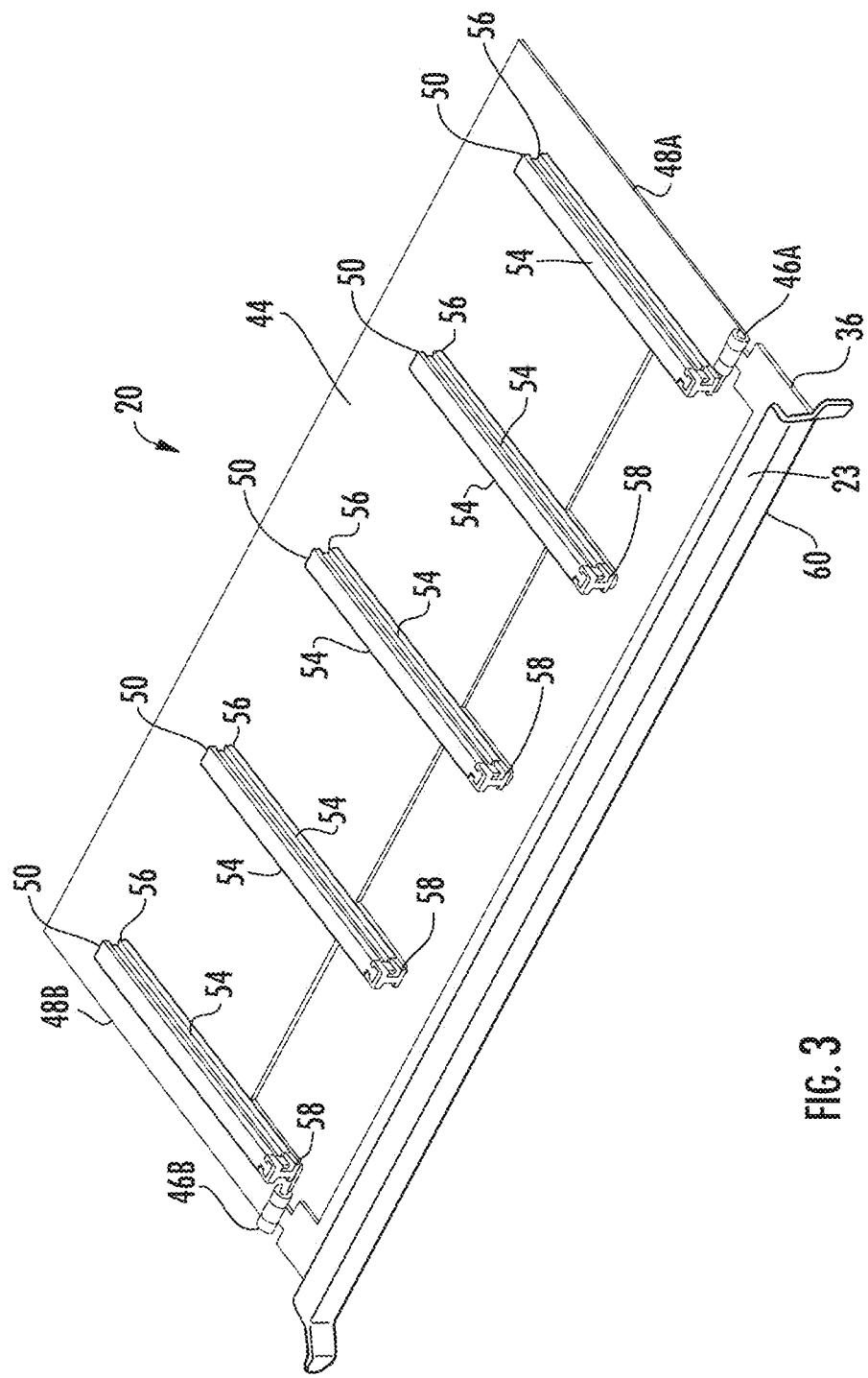
FIG. 3 is a front perspective view of an individual fiber optic equipment tray in the fiber optic equipment of FIG. 1 without rear-installable fiber optic modules installed in module guides disposed in the fiber optic equipment tray.

FIG. 3 illustrates an individual fiber optic equipment tray 20 not disposed in the chassis 12 or contained within the tray rail guides 32A, 32B for further discussion and illustration. As illustrated therein, the fiber optic equipment tray 20 contains a main tray portion 44 and the fiber routing tray 36 attached thereto. The fiber routing tray 36 is attached to the main tray portion 44 via hinge mechanisms in the form of hinges 46A, 46B disposed on each end 48A, 48B of the main tray portion 44. The main tray portion 44 contains a plurality of module guides in the form of module rail guides 50 that support the fiber optic modules 22. More specifically, the fiber optic modules 22 contain rails (elements 52A, 52B in FIG. 4) that couple to tray channels 54 disposed within the module rail guides 50. The fiber optic modules 22 are disposed in a row arrangement if at least one intermediate module rail guide 50 is disposed in the fiber optic equipment tray 20. Providing a plurality of tray channels 54 in each module rail guide 50 allows a plurality of fiber optic modules 22 to be stacked on top of each other in a column arrangement. The fiber optic modules 22 can be moved within the module rail guides 50 in the fiber optic equipment tray 20 either towards the front end 24 of the chassis 12 or the rear section 26 or the chassis 12. The fiber optic equipment trays 20 can also be moved about the tray rail guides 32A, 32B. In this manner, the fiber optic equipment trays 20 can be translated independently of each other about the tray rail guides 32A, 32B, and each of the fiber optic modules 22 within a given fiber optic equipment tray 20 can be independently translated within their respective module rail guides 50.

Note that in FIG. 3, the fiber optic equipment tray 20 contains five (5) module rail guides 50, which means that the fiber optic equipment tray 20 can support four (4) individual fiber optic modules 22. Four (4) fiber optic modules 22 can be installed in the fiber optic equipment tray 20 of FIG. 3, or less than four as desired or as required according to installation requirements. Also as shown in FIG. 3 and as illustrated in more detail in FIG. 4, the module rail guides 50 are configured such that the tray channels 54 are open on a rear end 56 of the module rail guides 50. This allows the fiber optic modules 22 to be rear-installable into the fiber optic equipment trays 20 from the rear section 26 of the chassis 12. More specifically, the fiber optic equipment tray 20 is disposed in the chassis 12 such that the rear ends 56 of the module rail guides 50 are oriented towards the rear section 26 of the chassis 12. Thus, as will be discussed in more detail below, the fiber optic modules 22 can be inserted into the rear ends 56 of the module rail guides 50 and pushed forward within the module rail guides 50 until the fiber optic modules 22 reach a front end 58 of each module rail guide 50. A locking feature may be provided to prevent the fiber optic module 22 from extending beyond the front end 58 of the module rail guides 50 unless a release is engaged. In this manner, the fiber optic modules 22 can be installed from the rear of the chassis 12, but can also be extended and removed from the front end 24 of the chassis 12 as well.

Also as illustrated in FIG. 3, the fiber routing tray 36 is formed from sheet metal or other material that is bent on top of itself in a U-shape on a front end 60 of the fiber routing tray 36. In this manner, optic fibers extending from the fiber optic modules 22 installed in the fiber optic equipment tray 20, and in particular the module rail guides 50 disposed therein, can be routed underneath a lip section 23 contained in the fiber routing tray 36 and disposed to either end 48A, 48B of the fiber optic equipment tray 20 to be routed for connection to other fiber optic equipment.

Figure 4:
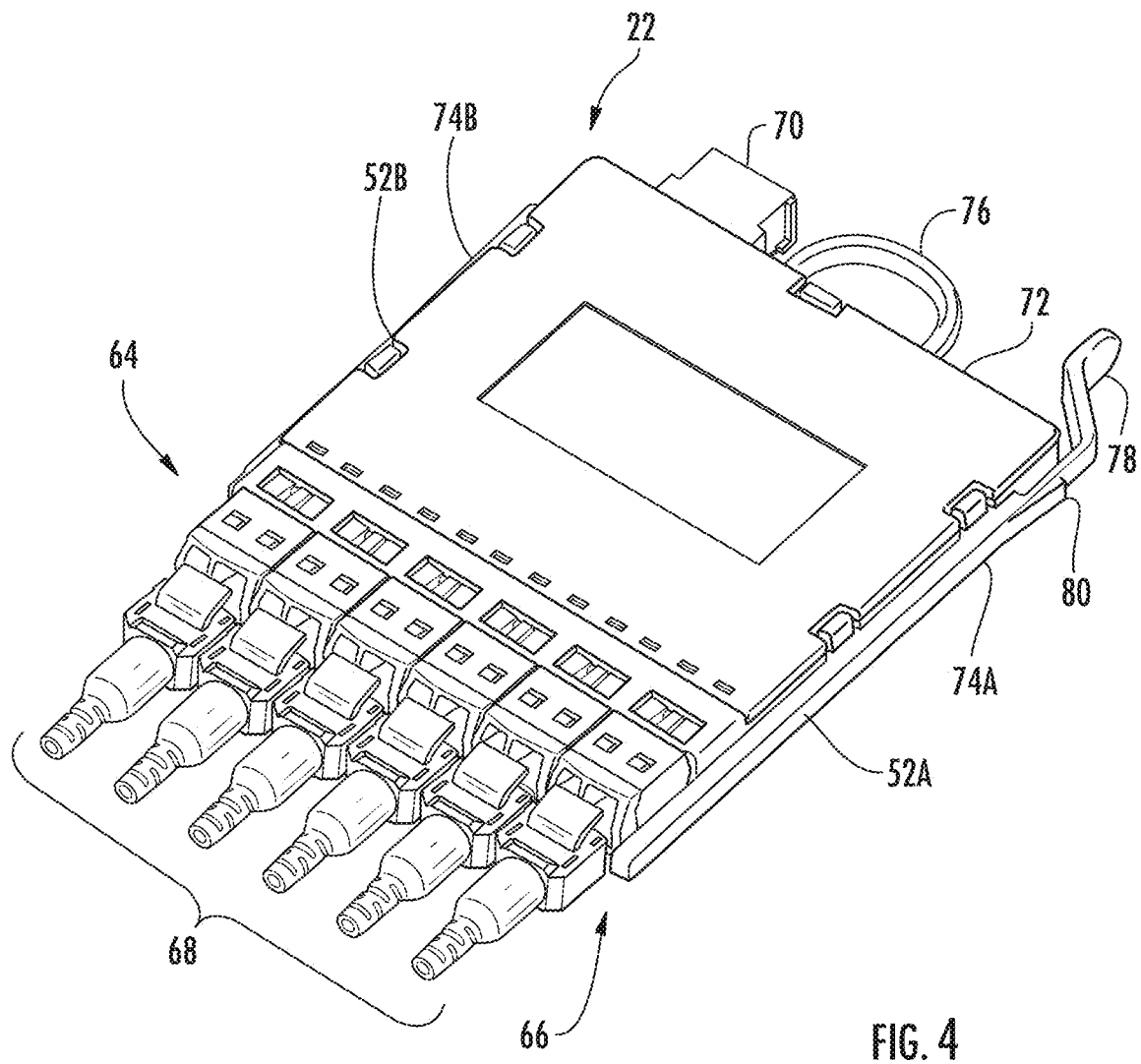
FIG. 4 is a front perspective view of a fiber optic module that is rear-installable in the fiber optic equipment tray of FIG. 3.

FIG. 4 illustrates an example of a fiber optic module 22 that is supported in the fiber optic equipment tray 20 in FIGS. 1-3. As illustrated therein, the fiber optic module 22 is comprised of a number of fiber optic adapters 64 disposed on a front end 66 of the fiber optic module 22. In this example, the fiber optic adapters 64 accept duplex LC fiber optic connectors 68. However, any fiber optic connection type desired can be provided in the fiber optic modules 22. Fiber optic cables extend from the fiber optic connectors 68 to establish fiber optic connections with other equipment. Another fiber optic adapter 70 is disposed on a rear end 72 of the fiber optic module 22. In this example, the fiber optic adapter 70 is an MTP fiber optic adapter equipped to establish connections to up to twelve (12) optical fibers. The fiber optic module 22 may also manage polarity between the fiber optic connectors 68 and the fiber optic adapters 64 disposed on the front end 66 of the fiber optic module 22 and the fiber optic adapter 70 disposed on the rear end 72 of the fiber optic module 22.

Module rails 52A, 52B are disposed on each side 74A, 74B of the fiber optic module 22. The module rails 52A, 52B are configured to be inserted within the tray channels 54 of the module rail guides 50 in the fiber optic equipment tray 20 as illustrated in FIG. 3. In this manner, when it is desired to install the fiber optic module 22 in the fiber optic equipment tray 20, the front end 66 of the fiber optic module 22 can be inserted from the rear section 26 of the chassis 12. More specifically, the front end 66 of the fiber optic module 22 is inserted into the tray channels 54 of the module rail guides 50 at their rear ends 56. In this manner, the fiber optic module 22 is rear-installable in the fiber optic equipment tray 20 and the chassis 12. The fiber optic module 22 can then be pushed forward within the tray channels 54 until the fiber optic module 22 reaches the front end 58 of the module rail guides 50. In this manner, a technician can install a fiber optic connection to the fiber optic adapter 70 disposed on the rear end 72 of the fiber optic module 22 and can then install the fiber optic module 22 from the rear section 26 of the chassis 12 into the fiber optic equipment tray 20.

Figure 5:
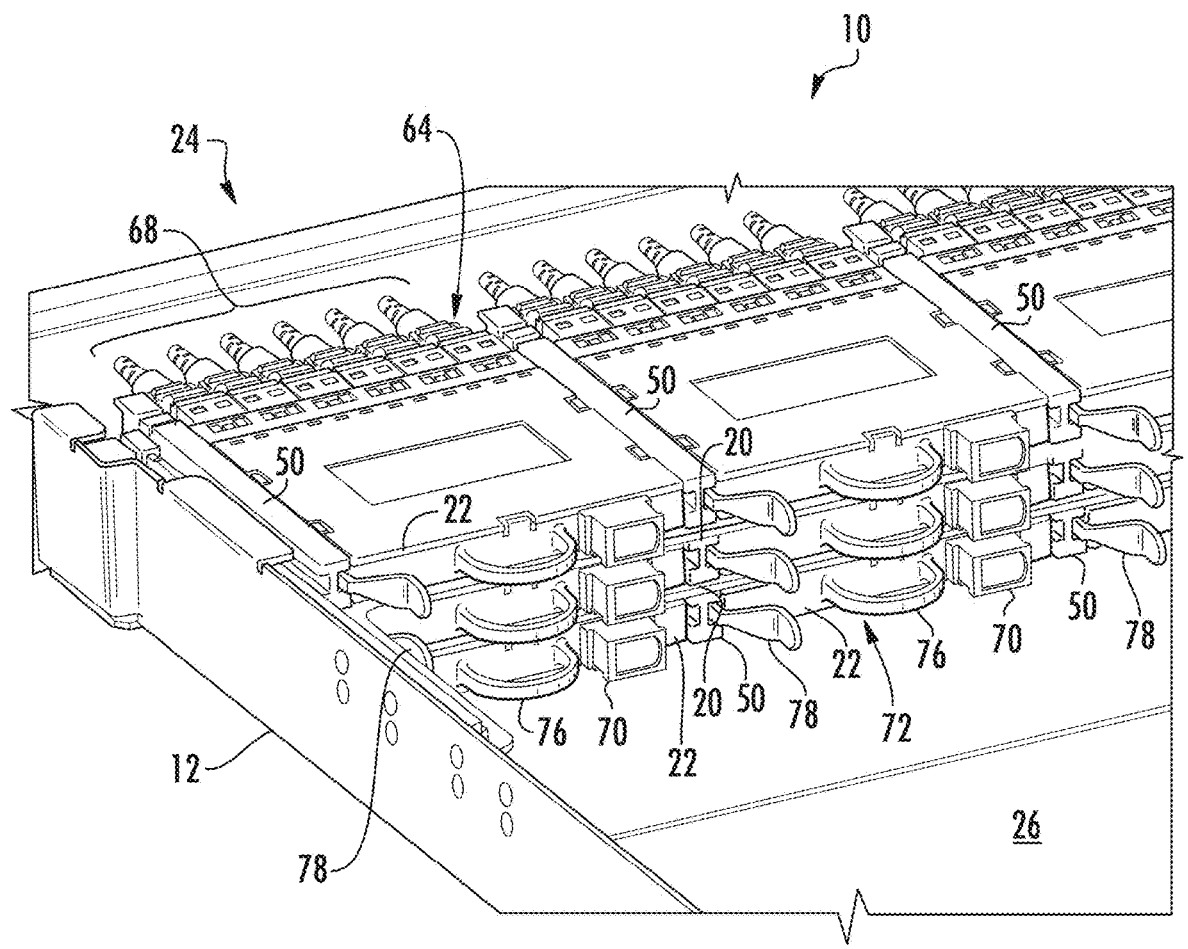
FIG. 5 is a rear perspective close-up view of the rear-installable fiber optic module of FIG. 4 installed in the fiber optic equipment tray of FIG. 3.

In this regard, FIG. 5 illustrates a rear perspective view of the fiber optic modules 22 installed in the fiber optic equipment trays 20 and the module rail guides 50 disposed therein. As illustrated therein, when the fiber optic module 22 is installed in the tray channels 54 of the module rail guides 50 from the rear section 26 of the chassis 12, the module rails 52A, 52B of the fiber optic module 22 move towards the front end 24 within the tray channels 54. The fiber optic module 22 can be moved towards the front end 24 until the fiber optic modules 22 reach a stop or locking feature disposed in the front end 24 as will described later in this application. A locking feature in the form of a locking latch 78 and a protrusion 80 (FIG. 4) engage a complementary protrusion disposed in the tray channel 54 such that the fiber optic module 22. The locking latch 78 is inwardly biased such that the fiber optic module 22 can be installed in the tray rail guides 32, but cannot be pulled back towards the rear section 26 of the chassis 12 until the locking latch 78 is disengaged to prevent the protrusion 80 from engaging with the module rail guides 50. The locking latch 78 is disengaged by pushing it inward towards the fiber optic module 22 to release the protrusion 80 from the tray channel 54.

If it is desired to remove the fiber optic module 22 from the fiber optic equipment tray 20, the fiber optic module 22 can be removed from either the rear section 26 of the chassis 12 or from the front end 24 of the chassis 12. To remove the fiber optic module 22 from the rear section 26 of the chassis 12, a pulling loop 76 disposed in the rear end 72 of the fiber optic module 22 can be pulled once the locking latch 78 is disengaged inward. The locking latch 78 controls the position of the protrusion 80 extending outward from the module rail 52A such that when the fiber optic module 22 is extended along a certain portion of the module rail guides 50, the protrusion 80 prevents the fiber optic module 22 from moving backwards along the tray channels 54 towards the rear section 26 of the chassis 12.

Figure 6A:
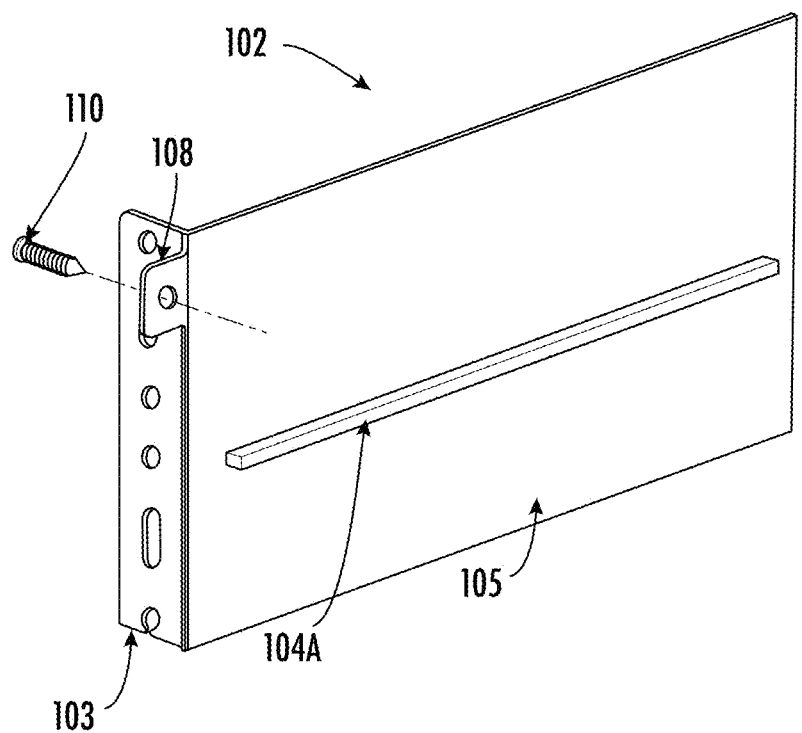
FIGS. 6A and 6B illustrate perspective views or example support brackets.
Figure 6B:
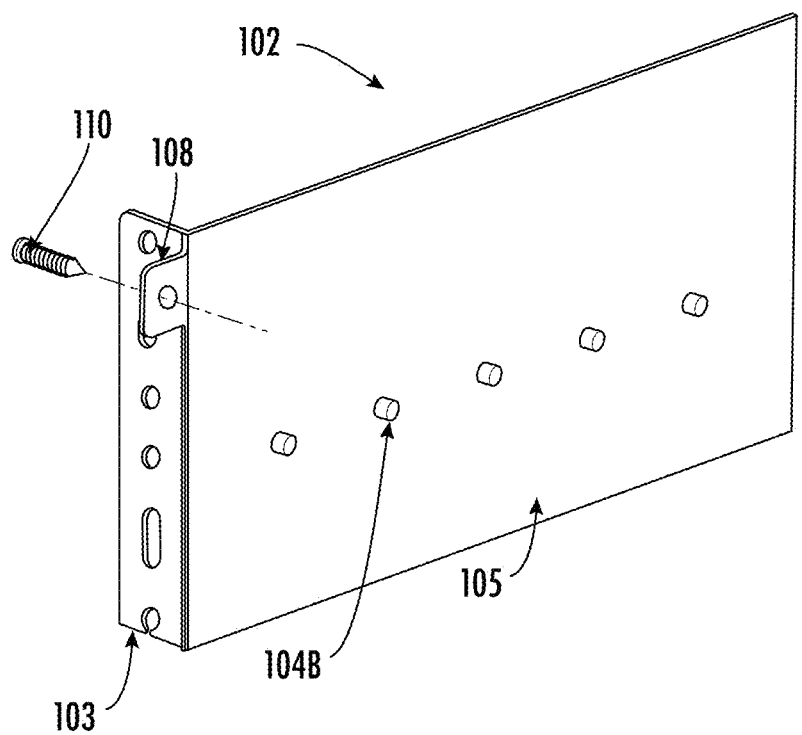

Turning to FIGS. 6A and 6B, a support bracket 102 may be provided. In some embodiments, a set of opposing support brackets 102 may be provided. The support bracket 102 may be configured to mount to the equipment rack 14 (FIG. 1) by one or more fasteners, such as screws, bolts, push-pull plungers, or other suitable fasteners. The support bracket 102 may include a front flange configured to abut the equipment rack 14. In some embodiments, the front flange 103 may include one or more apertures configured to receive a fastener therethrough. The support bracket 102 may include a support plate 105 extending from the front flange 103. The support plate 105 includes an outer face and an inner face. A support feature 104 may be disposed on the inner face of the support plate 105. The support feature 104 may be configured to slidably support the chassis 12. In the example depicted in FIG. 6A, the support feature 104 is a ledge 104A extending from the inner face of the support plate 105. The ledge 104A may be integral or detachable from the support plate 105, such as by one or more fasteners. The ledge 104A may be continuous or may be formed of a plurality of ledge portions extending substantially linearly. In the example depicted in FIG. 6B, the support feature 104 includes a plurality of cylindrical projections 104B extending from the inner face of the support plate 105. The cylindrical projections 104B may extend substantially linearly, such that the plurality of support projections 104B form a support plane.

Figure 7:
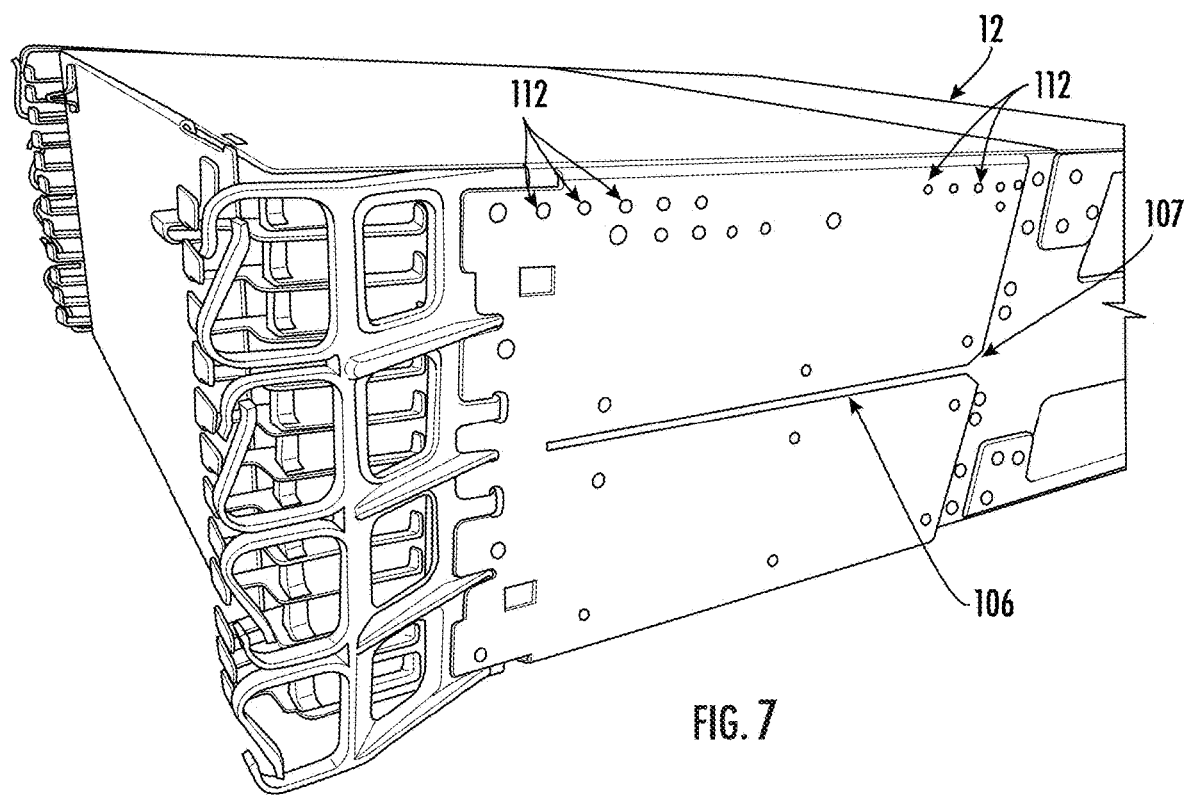
FIG. 7 illustrates a perspective view of a chassis including a support track and apertures configure to interface with support bracket of FIG. 6A or 6B.

Turning to FIG. 7, the chassis 12 may include support track 106, formed as a recess or opening 106, in a sidewall. The support track 106 may be configured to receive the support feature 104. The chassis 12 may be configured to be slidably supported on the support feature 104 by the support track 106. In some embodiments, the support track 106 may include a beveled or flared opening 107 configured to guide the support feature 104 into the support track 106. The chassis 12 may be moved forward (outward) or backward (inward), relative to the equipment rack 14 by sliding the support track 106 of the chassis 12 on the support feature 104. As such, the support feature 104 and associated support bracket 102 supports the weight of the chassis 12 during translation, which may aid in the of installation, removal, or repositioning of the chassis 12. More particularly, the support brackets 102 may be installed prior to the chassis 12, alleviating any need to support the weight of the chassis while installing the fasteners to retain support brackets.

The support bracket 102 may include a projection set assembly including a retention element 108 and a movable projection 110. The retention element 108 may include a portion of the support plat 105 that extends beyond the front flange 103. The support tab may include an aperture configured to retain a movable projection 110. The removable projection 110 may include a spring plunger, a set screw, or other movable fastener. The chassis 12 may include a plurality of detents or apertures 112 disposed in the sidewall. The moveable projection 110 may transition between a locked position and an unlocked position. In the locked position, the movable projection 110 may extend into one of the detents or apertures 112 preventing forward or rearward movement of the chassis 12 relative to the equipment rack 14. In the unlocked position, the movable projection 110 may be withdrawn from the detents or apertures 112, such that the chassis 12 is permitted to move forward or rearward relative the equipment rack. The engagement of the movable projection 110 into one of the detents or apertures 112 defines the projection of the chassis 12 from the equipment rack 14.

Figure 8A:
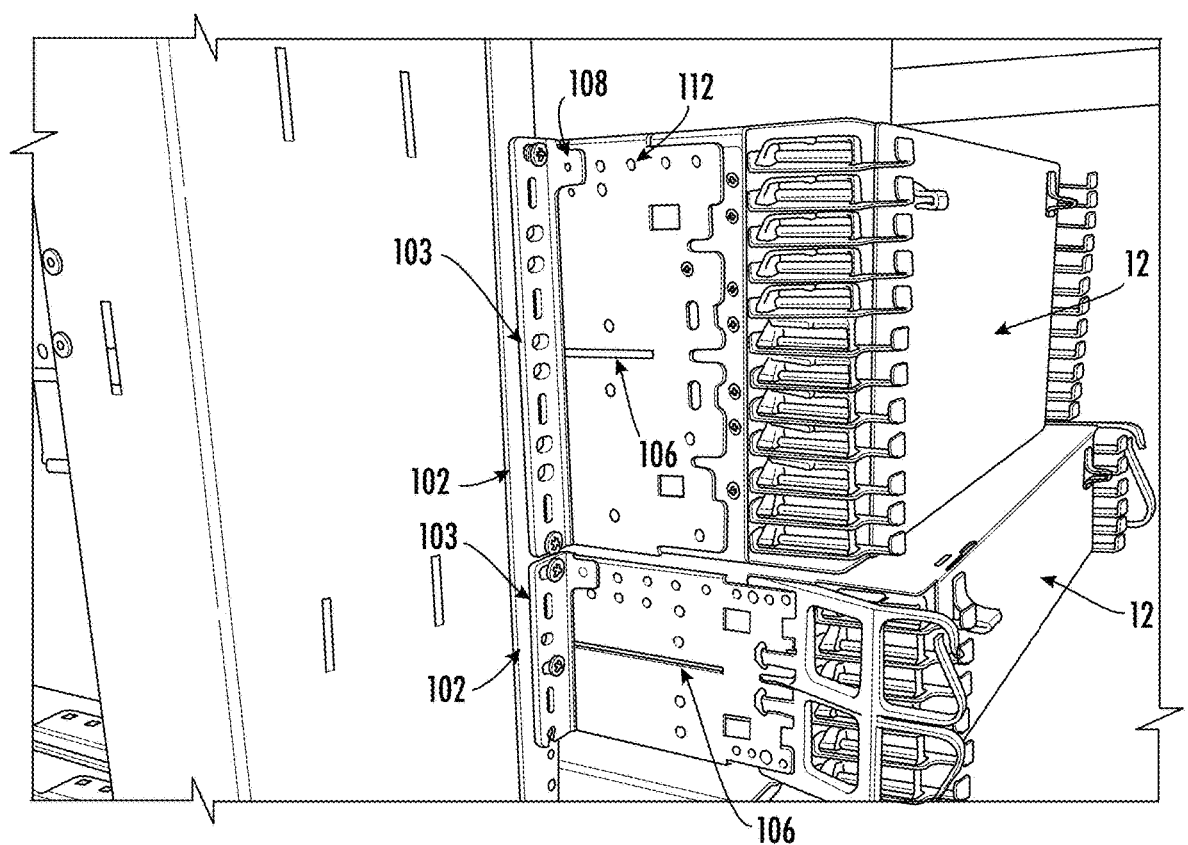
FIGS. 8A-8C illustrate translation of the chassis relative the an equipment rack.
Figure 8B:
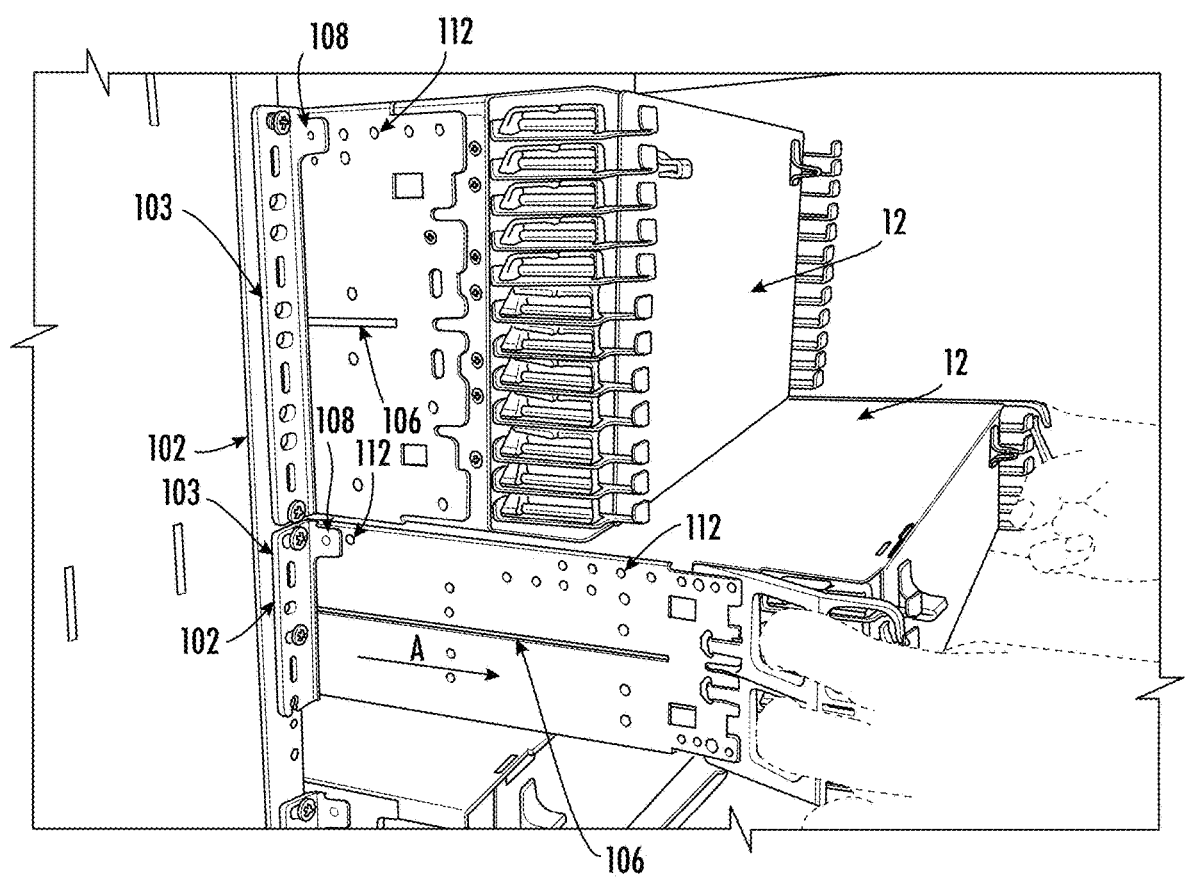
Figure 8C:
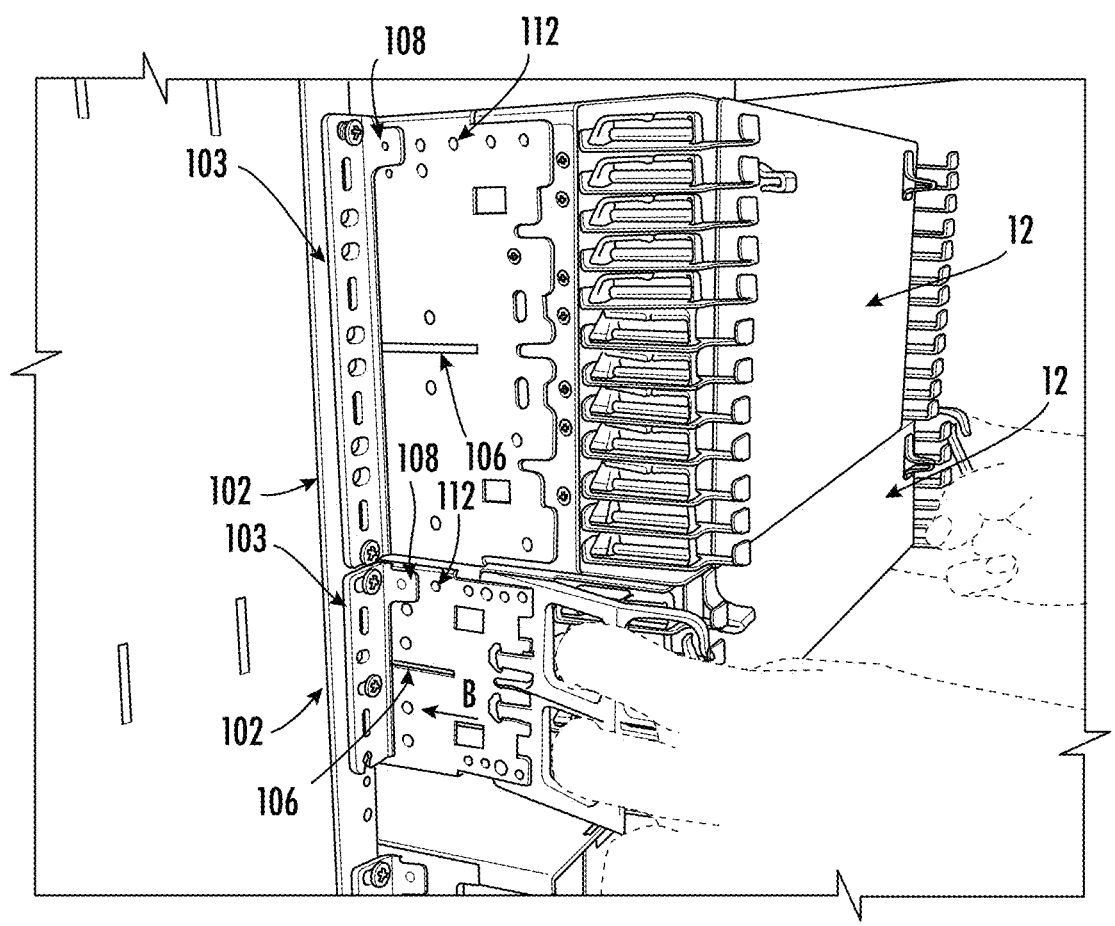

FIGS. 8A-8C illustrate translation of the chassis 12 relative to the equipment rack 14 to adjust the projection of the chassis 12 from the equipment rack 14. The movable projection 110, here a set screw, has been removed from the retention element 108, e.g. the movable projection 110 is in an unlocked position. The technician may translate the chassis 12 forward, as depicted in FIG. 8B and indicated by arrow A. Alternatively, the technician may translate the chassis rearwardly, as depicted in FIG. 8C and indicated by arrow B. Once the desire projection from the equipment rack 14 is achieved, the technician may reinsert the movable projection 110 into the retention element 108 and engage the recess or aperture 112 in the sidewall of the chassis, e.g. the movable projection may be placed in the locked position, defining the projection of the chassis from the equipment rack 14.

In an example embodiment, a fiber optic apparatus is provided includes a support bracket configured to be mounted to an equipment rack, the bracket having a movable projection extending therefrom, a chassis having opposite front and rear ends that are spaced apart from one another in a longitudinal direction, a guide system disposed within the chassis and in receipt of a plurality of fiber optic equipment trays each independently translatable in the longitudinal direction about the chassis, each of the plurality of fiber optic equipment trays being in receipt of at least one fiber optic module, a plurality of fiber routing trays each disposed in a front end of a fiber optic equipment tray among the plurality of fiber optic equipment trays, and each of the at least one fiber optic module having a front end, a rear end, and an inside, an at least one fiber optic adapter disposed through the front end, and at least one optical fiber provided within the inside of the at least one fiber optic module connected to the at least one fiber optic adapter. The chassis includes a plurality of detents or apertures configured to receive the movable projection and the engagement of the movable projection into one of the detents or apertures defines the projection of the chassis from the equipment rack.

In some example embodiments, the fiber optic apparatus also includes a support feature disposed on a face of the support bracket, and the chassis includes a recess or opening in a sidewall configured to receive the support feature. In an example embodiment, the support feature includes a plurality of cylindrical projections aligned substantially linearly. In some example embodiments, the support feature comprises an integral ledge extending from the face of the support bracket. In an example embodiment, the recess or opening includes a beveled portion configured to guide the support feature into the recess or opening. In some example embodiments, the movable projection comprises a set screw. In an example embodiment, the movable projection includes a spring plunger. In some example embodiments, the support bracket includes a first support bracket and the chassis assembly also includes a second support bracket configured to be mounted to the equipment rack opposite the first support bracket and support the chassis. In some example embodiments, the movable projection includes a first moveable projection and the second support bracket includes a second movable projection extending therefrom. The chassis including a second plurality of detents or apertures configured to receive the second movable projection. In an example embodiment, the chassis translates forward or backward relative to the equipment rack when the movable projection is in an unlocked position, and movement of the chassis is restricted when the movable projection is in a locked position.

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic modules, use of a fiber optic equipment tray, fiber optic connection type, number of fiber optic adapters, density, etc.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic apparatus comprising:
   a support bracket configured to be mounted to an equipment rack, the support bracket having a movable projection extending therefrom;
   a chassis having opposite front and rear ends that are spaced apart from one another in a longitudinal direction, wherein the chassis comprises a plurality of detents or apertures configured to receive the movable projection, wherein the engagement of the movable projection into one of the plurality of detents or apertures defines a projection of the chassis from the equipment rack;
   a guide system disposed within the chassis and in receipt of a plurality of fiber optic equipment trays each independently translatable in the longitudinal direction about the chassis;
   each of the plurality of fiber optic equipment trays being in receipt of at least one fiber optic module;
   a plurality of fiber routing trays each disposed in a front end of one of a fiber optic equipment tray among the plurality of fiber optic equipment trays; and
   each of the at least one fiber optic module having a front end, a rear end, and an inside, an at least one fiber optic adapter disposed through the front end, and at least one optical fiber provided within the inside of the at least one fiber optic module connected to the at least one fiber optic adapter;
   a support feature disposed on a face of the support bracket, and
   wherein the chassis comprises a recess or opening in a sidewall configured to receive the support feature.

2. The fiber optic apparatus of claim 1, wherein the support feature comprises a plurality of cylindrical projections aligned substantially linearly.

3. The fiber optic apparatus of claim 1, wherein the support feature comprises an integral ledge extending from the face of the support bracket.

4. The fiber optic apparatus of claim 1, wherein the recess or opening includes a beveled portion configured to guide the support feature into the recess or opening.

5. The fiber optic apparatus of claim 1, wherein the movable projection comprises a set screw.

6. The fiber optic apparatus of claim 1, wherein the movable projection comprises a spring plunger.

7. The fiber optic apparatus of claim 1, wherein the support bracket comprises a first support bracket and the fiber optic apparatus further comprises:
   a second support bracket configured to be mounted to the equipment rack opposite the first support bracket and support the chassis.

8. The fiber optic apparatus of claim 7, wherein the movable projection comprises a first moveable projection and the second support bracket further comprises a second movable projection extending therefrom, and
   wherein the chassis including a second plurality of detents or apertures configured to receive the second movable projection.

9. The fiber optic apparatus of claim 1, wherein the chassis translates forward or backward relative to the equipment rack when the movable projection is in an unlocked position, and movement of the chassis is restricted when the movable projection is in a locked position.

10. A fiber optic apparatus comprising:
    a support bracket configured to be mounted to an equipment rack, the support bracket having a movable projection extending therefrom; and
    a chassis configured to support fiber optic communication equipment, the chassis including a plurality of detents or apertures configured to receive the movable projection, wherein the engagement of the movable projection into one of the plurality of detents or apertures defines a projection of the chassis from the equipment rack;
    a support feature disposed on a face of the support bracket, and
    wherein the chassis comprises a recess or opening in a sidewall configured to receive the support feature.

11. The fiber optic apparatus of claim 10, wherein the support feature comprises a plurality of cylindrical projections aligned substantially linearly.

12. The fiber optic apparatus of claim 10, wherein the support feature comprises an integral ledge extending from the face of the support bracket.

13. The fiber optic apparatus of claim 10, wherein the recess or opening includes a beveled portion configured to guide the support feature into the recess or opening.

14. The fiber optic apparatus of claim 10, wherein the movable projection comprises a set screw.

15. The fiber optic apparatus of claim 10, wherein the movable projection comprises a spring plunger.

16. The fiber optic apparatus of claim 10, wherein the support bracket comprises a first support bracket and the fiber optic apparatus further comprises:
    a second support bracket configured to be mounted to the equipment rack opposite the first support bracket and support the chassis.

17. The fiber optic apparatus of claim 16, wherein the movable projection comprises a first moveable projection and the second support bracket further comprises a second movable projection extending therefrom, and
    wherein the chassis including a second plurality of detents or apertures configured to receive the second movable projection.

18. The fiber optic apparatus of claim 10, wherein the chassis translates forward or backward relative to the equipment rack when the movable projection is in an unlocked position, and movement of the chassis is restricted when the movable projection is in a locked position.

* * * * *